Patented Mar. 10, 1936

2,033,708

UNITED STATES PATENT OFFICE 2,033,708

VAT DYESTUFFS, AND PROCESS OF MAKING SAME

Hermann Hauser, Binningen, near Basel, and Max Bommer, Riehen, near Basel, Switzerland, assignors to the firm of Society of Chemical Industry in Basle, Basel, Switzerland No Drawing. Application May 31, 1935, Serial No. 24,454. In Switzerland June 5, 1934

10 Claims. (Cl. 260—36)

It has been found that valuable vat dyestuffs may be produced by causing to react in a first step caustic alkaline agents with Bz-1-benzanthronyl-5-aminobenzanthrones and, in a second step, subjecting the products thus obtained to the action of halogenating agents.

In the reaction of caustic alkaline agents when, for instance, Bz-1-benzanthronyl-5-aminobenzanthrone of the formula

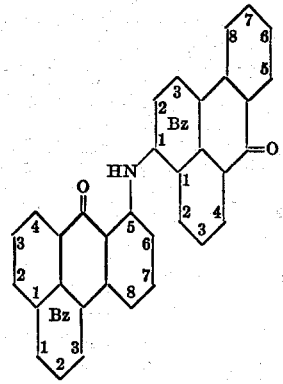

is used, there is obtained a vat dyestuff which contains the ring system of the formula

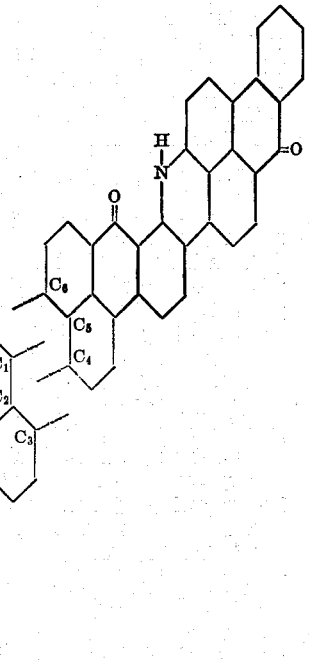

in which the carbon atoms $C_1$ to $C_6$ are members of one and the same six-membered carbon ring.

As caustic alkaline agents there may be used, for example, caustic soda or caustic potash or mixtures of these, either alone or in the presence of water; also sodium or potassium alcoholate, made, for example, from methyl alcohol, ethyl alcohol or butyl alcohol. The caustic alkaline agent may be used in presence of an excess of alcohol or of another solvent or diluent, for example aniline, naphthalene or a mineral oil.

The vat-dyestuffs obtained dye wool in particular violet to blue to greenish-blue tints which are very fast; they can be converted into the leucoesters, for instance into sulfuric acid ester.

In many cases the fastness of these dyestuffs is improved by treating them with an halogenating agent, for instance chlorine, bromine, sulfuryl-chloride or chlorosulfonic acid. The reaction may occur in presence of a catalyst, such as iodine, ferric chloride, antimony pentachloride or sulfur or in presence of a solvent or suspension medium, for instance nitrobenzene, dichlorobenzene, chlorosulfonic acid or methylsulfonic acid, or in presence of both such catalyst and solvent or suspension agent.

The following examples illustrate the invention, the parts being by weight:—

Example 1

120 parts of caustic potash and 80 parts of absolute ethyl alcohol are heated together to fusion. At about 150° C. there are introduced quickly into the mass 30 parts of Bz-1-benzanthronyl-5-amino-benzanthrone (made, for instance, by prolonged heating of a fused mixture of 5-aminobenzanthrone, Bz-1-bromobenzanthrone, sodium acetate, copper acetate and nitrobenzene, whereby brown needles soluble in concentrated sulfuric acid to an orange solution are obtained) and heating is continued for 3-4 hours at 150-170° C. The mass is then introduced into much water which is boiled until the dyestuff has become oxidized, whereupon the whole is filtered and the dyestuff washed and dried.

The dyestuff is thus obtained in the form of a dark blue, bronze powder, soluble in concentrated sulfuric acid to a reddish-blue solution. It dyes cotton from a blue vat very strong, fast navy blue tints.

Instead of the Bz-1-benzanthronyl-5-aminobenzanthrone there may be used such Bz-1-benzanthronyl-5-aminobenzanthrones which contain in the benzanthronyl radicals alkyl substituents, such as methyl or alkoxy-groups, for example methoxy- or ethoxy-groups, whereby a dyestuff with similar dyeing properties is obtained.

Example 2

10 parts of the dyestuff, obtainable as described in paragraphs 1 and 2 of Example 1, are dissolved at 10–20° C. in 100 parts of chlorosulfonic acid; 2 parts of iodine are added and the whole is stirred for a short time. At the same temperature 10 parts of bromine are then dropped in and the mixture is stirred for 5–6 hours.

The mixture is then poured upon ice, filtered and dried. The new dyestuff is obtained in the form of a dark blue, bronze powder soluble in concentrated sulfuric acid to a grey blue solution. Cotton is dyed from a reddish-blue vat greenish, marine-blue tints which have very good properties of fastness.

By working at a somewhat higher temperature a redder dyestuff of similar properties is obtained.

Example 3

10 parts of the dyestuff obtainable as described in paragraphs 1 and 2 of Example 1 are suspended in 150 parts of nitrobenzene. 2 parts of iodine are added and there is dropped in, at 90–100° C. a mixture of 20 parts of nitrobenzene and 10 parts of bromine. The said temperature is maintained for 3–4 hours and, after cooling, the dyestuff is separated by filtration. When dry it is a dark bronze powder, soluble in concentrated sulfuric acid to a reddish blue solution. Cotton is dyed from a reddish-blue vat very powerful and fast navy blue tints which are greener than those produced by the parent material.

Example 4

10 parts of the dyestuff obtainable as described in paragraphs 1 and 2 of Example 1, are suspended in 150 parts of nitrobenzene; the suspension is heated for a short time at 130–140° C. and then cooled to 60–65° C. At the latter temperature there are dropped in 10 parts of sulfurylchloride and the mixture is stirred for 15 hours. The dyestuff is then filtered hot and dried. It is a dark bronze powder, soluble in concentrated sulfuric acid to a solution which is somewhat redder than that of the parent material. Cotton is dyed from a blue vat very fast tints which are considerably purer and fuller than those produced by the parent material.

Example 5

32.5 parts of Bz-1-bromo-5-hydroxybenzanthrone of the formula

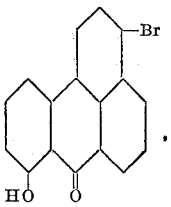

24.5 parts of 5-aminobenzanthrone, 15 parts of anhydrous sodium acetate, 1 part of copper acetate and 350 parts of nitrobenzene are heated to boiling for 18 hours. When cold, the product of the reaction is filtered, washed with nitrobenzene and alcohol and freed from inorganic constituents by boiling with water. The compound dissolves in concentrated sulfuric acid to an orange-red solution; when pouring the sulfuric acid solution into water there are obtained violet flakes.

20 parts of this anthrimide of the formula

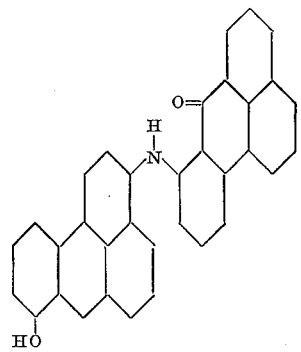

are now introduced at 150–160° C. into a melt consisting of 120 parts of caustic potash and 50 parts of alcohol, and kept at this temperature for 3–4 hours. The new dyestuff is isolated by pouring the melt into water and oxidation with air. It dissolves in concentrated sulfuric acid to a red-violet solution. When introducing the sulfuric acid solution into water, there are obtained blue flakes.

Cotton is dyed from a blue-violet vat strong greenish navy blue tints.

The Bz - 1 - bromo - 5 - hydroxybenzanthrone named in the first paragraph of this example as parent material is a light orange crystalline powder of melting point 209–211° C. It can be obtained by brominating 5-chlorobenzanthrone, and replacing the chlorine by the hydroxyl-group by first replacing the chlorine by the amino-group and then, in the usual manner, the amino-group via the diazo-compound by the hydroxyl-group.

What we claim is:—

1. In the manufacture of vat-dyestuffs the step which comprises heating caustic alkaline agents with Bz-1-benzanthronyl-5-aminobenzanthrones.

2. In the manufacture of vat dyestuffs the step which comprises heating solutions of potassium hydroxide in alcohol with Bz-1-benzanthronyl-5-aminobenzanthrones.

3. In the manufacture of vat dyestuffs the step which consists in reacting halogenating agents with the products obtained by heating caustic alkaline agents with Bz-1-benzanthronyl-5-aminobenzanthrones.

4. In the manufacture of vat dyestuffs, the step which consists in reacting chlorinating agents with the products obtained by heating caustic alkaline agents with Bz-1-benzanthronyl-5-aminobenzanthrones.

5. In the manufacture of vat dyestuffs, the step which consists in reacting chlorinating agents with the products obtained by heating solutions of potassium hydroxide in alcohol with Bz-1-benzanthronyl-5-aminobenzanthrones.

6. Process for the manufacture of vat dyestuffs, consisting in heating in a first step caustic alkaline agents with Bz-1-benzanthronyl-5-aminobenzanthrones, and, in a second step, subjecting the products thus obtained to the action of halogenating agents.

7. Process for the manufacture of vat dyestuffs, consisting in heating in a first step, solutions of potassium hydroxide in alcohol with Bz-1-benzanthronyl-5-aminobenzanthrones, and, in a second step, subjecting the products thus obtained to the action of halogenating agents.

8. Process for the manufacture of vat dyestuffs, consisting in heating in a first step, solutions of potassium hydroxide in alcohol with Bz-1-benzanthronyl-5-aminobenzanthrones, and, in a second step, subjecting the products thus obtained to the action of chlorinating agents.

9. Vat dyestuffs containing the ring system

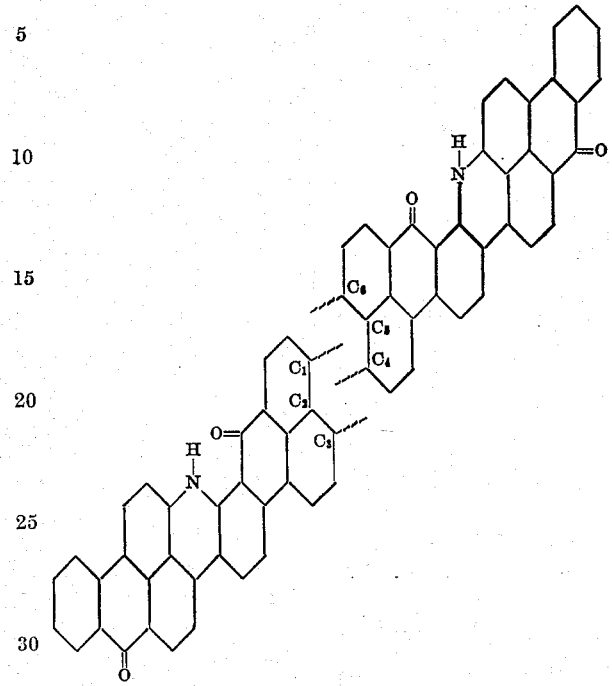

in which the carbon atoms $C_1$ to $C_6$ are members of one and the same six-membered carbon ring, which dyestuffs are dark bronze powders dissolving in concentrated sulfuric acid to blue solutions and dyeing cotton from a blue colored vat fast violet to blue tints.

10. Vat dyestuffs of the formula in which the carbon atoms $C_1$ to $C_6$ are members of one and the same six-membered carbon ring and in which $x$ represents halogen, which dyestuffs are dark bronze powders dissolving in concentrated sulfuric acid to blue solutions and dyeing cotton from a blue colored vat fast navy blue tints.

HERMANN HAUSER.
MAX BOMMER.